United States Patent
Lee

(10) Patent No.: US 7,284,940 B2
(45) Date of Patent: Oct. 23, 2007

(54) NAIL HAVING FLEXIBLE SLEEVE MOUNTED THERETO

(75) Inventor: Yi Kuan Lee, Da-Li (TW)

(73) Assignee: Samson Power Tool Co., Ltd., Da-Ling, Taichung County (TW)

( * ) Notice: Subject to any disclaimer, the term of this patent is extended or adjusted under 35 U.S.C. 154(b) by 0 days.

(21) Appl. No.: 11/363,875

(22) Filed: Feb. 27, 2006

(65) Prior Publication Data

US 2006/0269382 A1    Nov. 30, 2006

(30) Foreign Application Priority Data

May 31, 2005  (TW) ............................... 94208943 U

(51) Int. Cl.
*F16B 15/00*  (2006.01)
(52) U.S. Cl. .................... 411/447; 411/455; 411/487; 411/903
(58) Field of Classification Search ............... 411/446, 411/447, 487, 455, 450, 902, 903, 914, 542, 411/371.1
See application file for complete search history.

(56) References Cited

U.S. PATENT DOCUMENTS

| 429,527 | A | * | 6/1890 | Churchward | ................ 227/109 |
| 1,200,594 | A | * | 10/1916 | Curtis | ........................ 411/455 |
| 1,733,008 | A | * | 10/1929 | Foos | ........................... 411/456 |
| 1,906,527 | A | * | 5/1933 | Bradley | ................... 411/451.5 |
| 2,724,303 | A | * | 11/1955 | Holcomb | .................... 411/439 |
| 3,513,747 | A | * | 5/1970 | Dirks | ....................... 411/487 |
| RE28,227 | E | * | 11/1974 | Elders | ....................... 411/453 |
| 4,003,175 | A | * | 1/1977 | Patry | ....................... 52/506.05 |
| 5,011,354 | A | * | 4/1991 | Brownlee | .................... 411/439 |
| 5,494,391 | A | * | 2/1996 | Zhou | .......................... 411/369 |
| 6,908,275 | B2 | * | 6/2005 | Nelson et al. | .............. 411/487 |

* cited by examiner

*Primary Examiner*—Flemming Saether
(74) *Attorney, Agent, or Firm*—Charles E. Baxley

(57) ABSTRACT

A nail includes a shank with a head and a tip portion on two ends of the shank. Two guide flanges extend radially outward from the shank and a flexible and deformable sleeve is mounted to the shank and located between the two guide flanges. The nail penetrates an object and defines a hole which is defined by a periphery which cuts into the sleeve so that the nail is cannot be pulled out from the object.

4 Claims, 3 Drawing Sheets

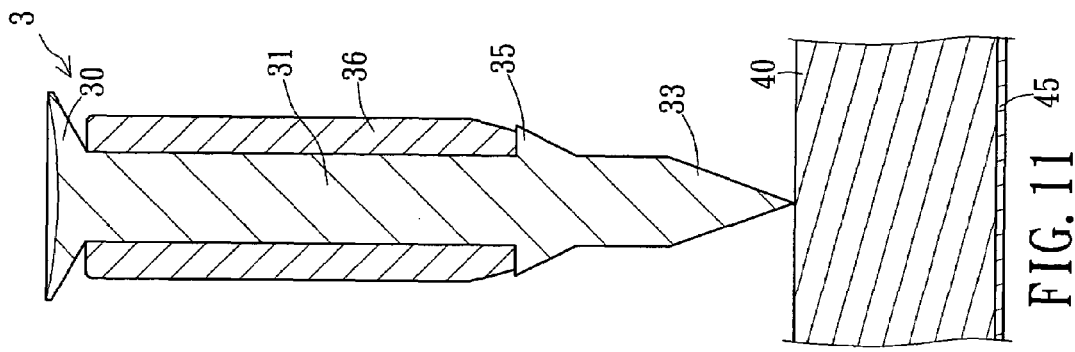
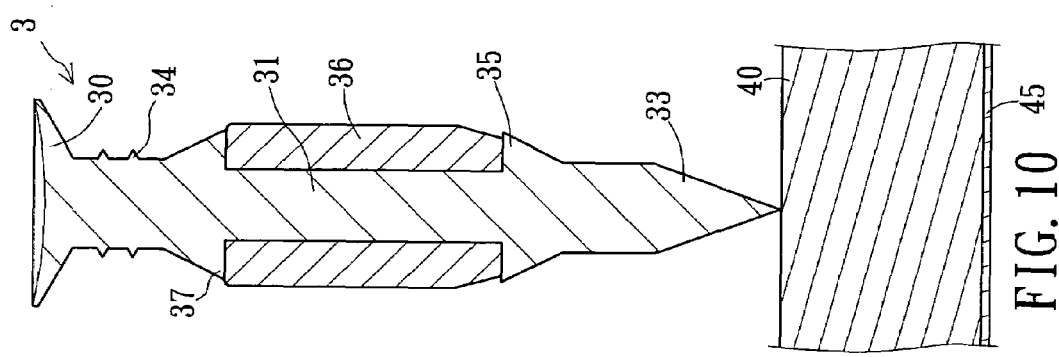
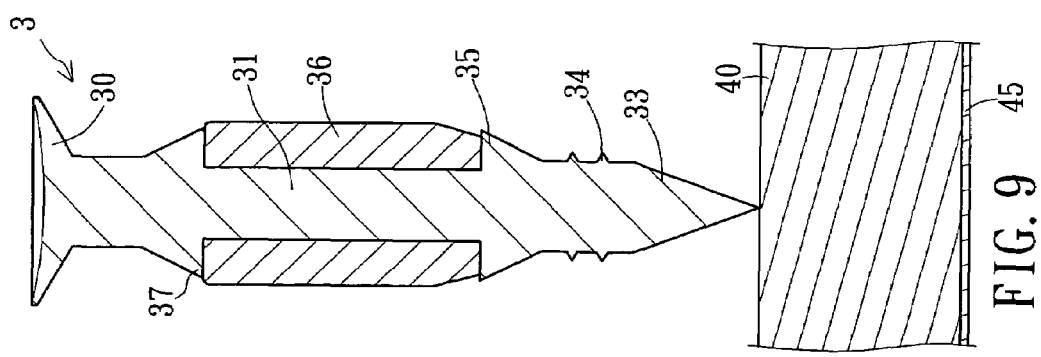

NAIL HAVING FLEXIBLE SLEEVE MOUNTED THERETO

FIELD OF THE INVENTION

The present invention relates to a nail structure for staplers and more particularly, to a nail that includes a flexible sleeve mounted thereto so as to be firmly engaged with the object to be nailed.

BACKGROUND OF THE INVENTION

A conventional nail 1 for staplers is shown in FIGS. 1 and 2 and generally includes a shank 11 with a head 10 at a first end of the shank 11 and a tip portion 13 at a second end of the shank 11. A plurality of engaging rings 12 are defined radially in a section of the shank 11. When the nail penetrates through an object 2, the tip portion 13 first penetrates the object 2 and the shank 11 an the engaging rings 12 are merged into the object 2 till the head 1 is completely engaged with the hole made by the penetration. The hole in the object includes an outward curve periphery 20 through which the nail 1 extends. It is noted that the outer diameter of the engaging rings 12 is the same as the diameter of the shank 11 so that the engaging rings 12 cannot firmly engage with the outward curve periphery 20 and the nail 1 can be easily pulled out from the object 2. Another conventional nail 1 is shown in FIGS. 3 and 4, and the engaging rings in FIG. 1 are replaced with longitudinal grooves 120 in the shank 11. Again, the grooves 120 cannot prevent the nail from being pulled out from the object.

The present invention intends to provide a nail that includes flexible and deformable sleeve which is deformed and engaged by the periphery defining the hole in the object so that the nail can be well positioned and cannot be pulled out from the object easily.

SUMMARY OF THE INVENTION

The present invention relates to a nail which comprises a shank with a head and a tip portion on two ends of the shank. Two tapered guide flanges extend radially outward from the shank and a diameter "A" of each of the guide flanges is larger than a diameter of the shank and less than a diameter of the head. A flexible and deformable sleeve is mounted to the shank and located between the two guide flanges.

The present invention will become more obvious from the following description when taken in connection with the accompanying drawings which show, for purposes of illustration only, a preferred embodiment in accordance with the present invention.

BRIEF DESCRIPTION OF THE DRAWINGS

FIG. 9 shows another embodiment of the nail of the present invention;

FIG. 10 shows yet another embodiment of the nail of the present invention, and FIG. 11 shows a further embodiment of the nail of the present invention.

DETAILED DESCRIPTION OF THE PREFERRED EMBODIMENT

Figures 1, 2, 3, 4:
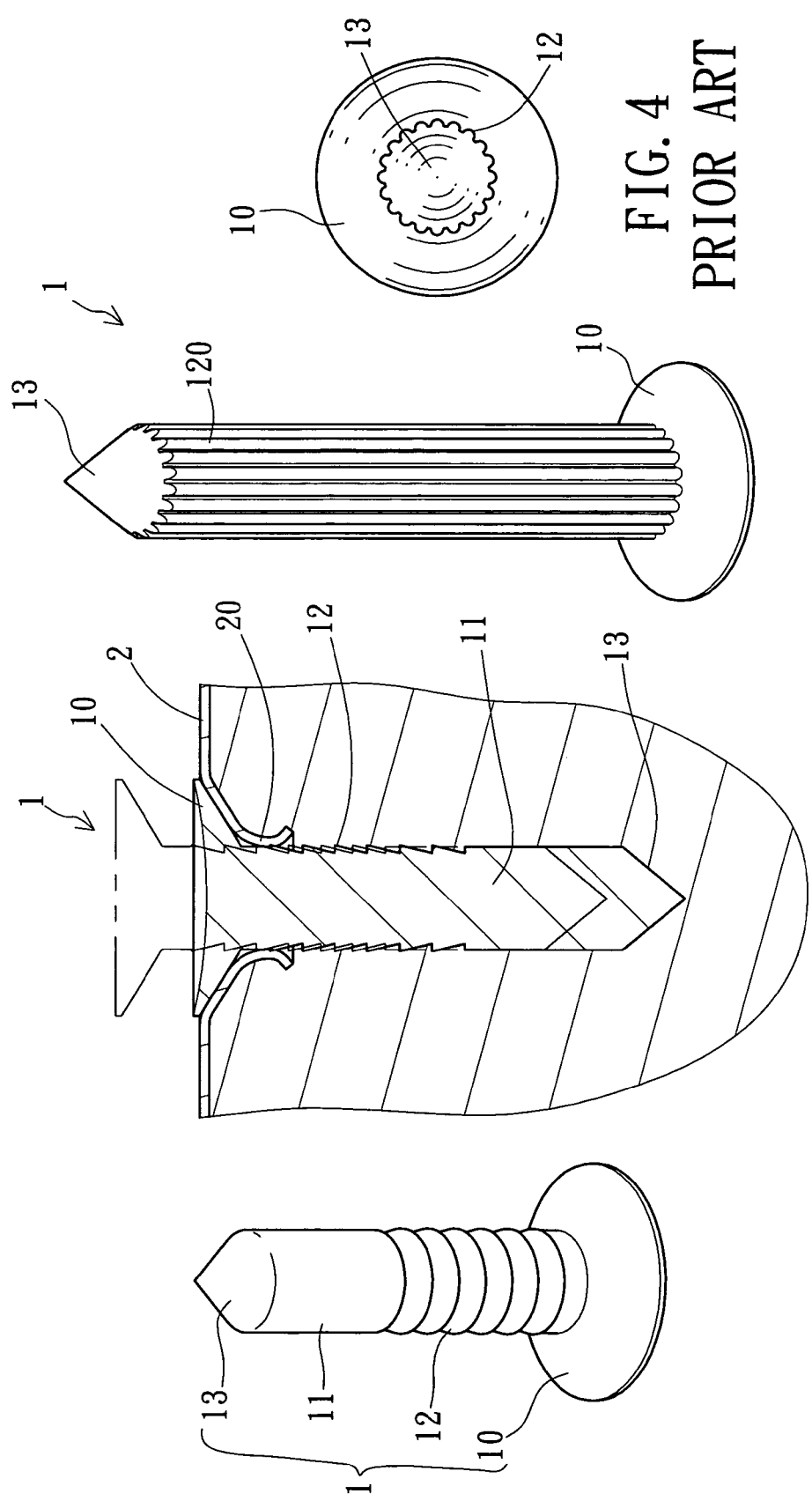
FIG. 1 is a perspective view to show a conventional nail.
FIG. 2 shows the conventional nail is nailed into an object.
FIG. 3 is a perspective view to show another conventional nail.
FIG. 4 is an end view of the conventional nail in FIG. 3.
Figure 8:
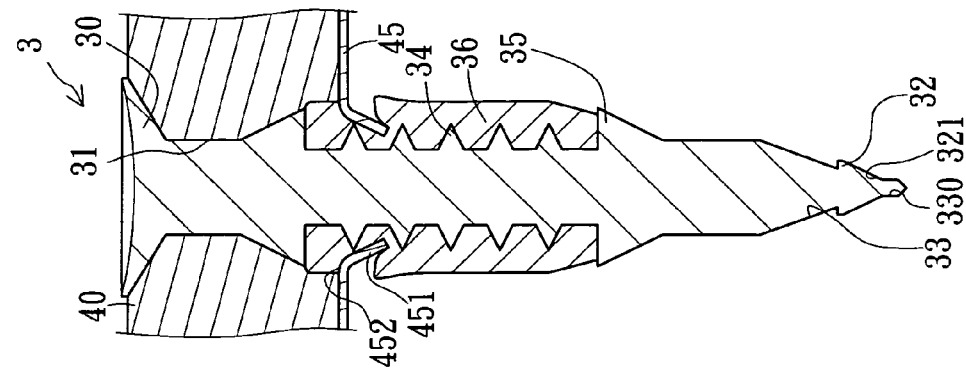
FIG. 8 shows that the periphery of the hole through which the nail penetrates is engaged with the sleeve.
Figure 7:
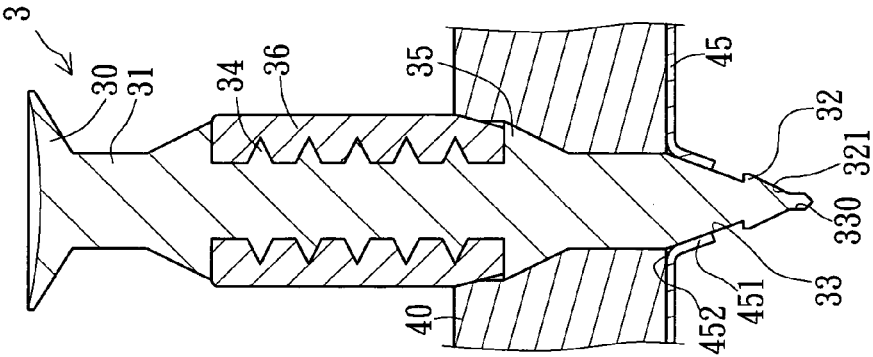
FIG. 7 shows the tip portion of the nail penetrates through the object and the sleeve enters into the object.

Referring to FIGS. 5 to 8, the nail 3 of the present invention comprises a shank 31 with a head 30 on a first end of the shank 31 and a tip portion 33 on a second end of the shank 31. Two guide flanges 35, 37 extend radially outward from the shank 31 and each of the guide flanges 35, 37 has and a tapered outer periphery. The guide flange 35 is tapered toward the tip portion 33 and the guide flange 37 is tapered toward the head 30. A diameter "A" of each of the guide flanges 35 is larger than a diameter "E" of the shank 31 and less than a diameter "D" of the head 30. A flexible and deformable sleeve 36 is mounted to the shank 31 and located between the two guide flanges 35, 37. A plurality of protrusions 34 extend radially outward from the shank 31 and located between the two guide flanges 35, 37. The protrusions 34 are firmly engaged with the sleeve 36. A diameter "B" of the sleeve 36 is not larger than a diameter "A" of each of the flanges 35, 37. A diameter "C" of the protrusions 34 is less than a diameter "A" of each of the flanges 35, 37. The tip portion 33 includes a plurality of wings 32 extending radially outward from an outer periphery of the tip portion 33 and each of wings 32 has a cutting edge 321.

Figure 6:
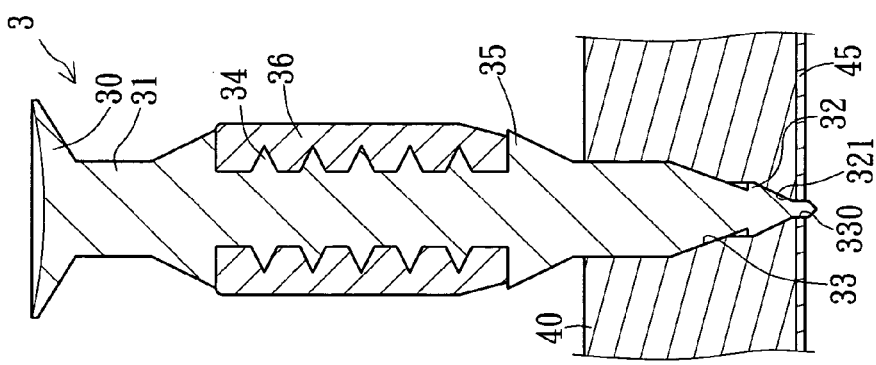
FIG. 6 shows the tip portion of the nail is merged into the object.
Figure 5:
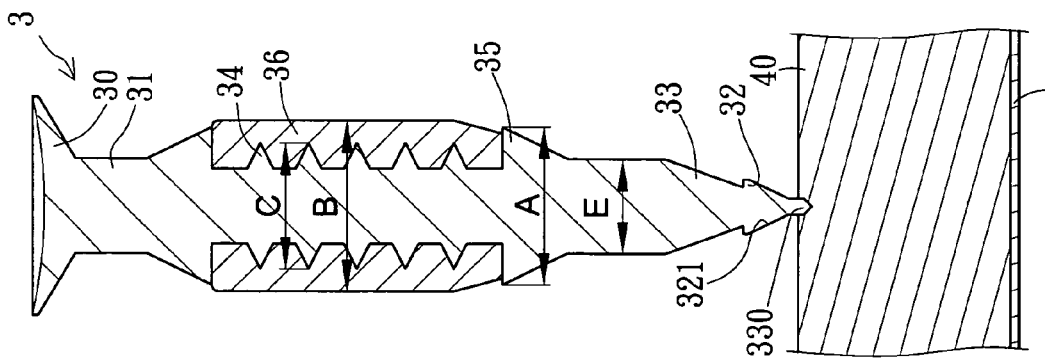
FIG. 5 is a cross sectional view to show the nail of the present invention and an object to be nailed.

When the nail 3 is to be nailed into an object which includes a first layer 40 and a second layer 45, the tip 330 of the tip portion 33 penetrates the surface of the first layer 40 of the object and the cutting edges 321 of the wings 32 then cut into the first layer 40 and guide the tip portion 33 to be merged into the first layer 40 as shown in FIG. 6. The downward force makes the tapered guide flange 35 penetrates into the first layer 40 and the sleeve 36 also enters into the first layer 40. The tip portion 33 penetrates through the second layer 45 and a hole 452 is defined through the second layer 45. The nail 3 keeps moving until the head 30 is in flush with the first layer 40. The periphery 451 of the hole 452 squeezes and deforms the sleeve 36. The periphery 451 is then engaged between the protrusions 34 such that the nail 3 is prevented from being pulled out from the object.

FIG. 9 shows that the protrusions 34 may extend radially outward from the shank 31 and are located between the guide flange 35 close to the tip portion 33 and the tip portion 33. FIG. 10 shows that protrusions 34 extend radially outward from the shank 31 and are located between the guide flange 37 close to the head 30 and the head 30.

FIG. 11 shows that the nail 3 includes only one guide flange 35 extending radially outward from the shank 31 and the flexible and deformable sleeve 36 is mounted to the shank 31 and located between the guide flange 35 and the head 30.

While we have shown and described the embodiment in accordance with the present invention, it should be clear to those skilled in the art that further embodiments may be made without departing from the scope of the present invention.

What is claimed is:

1. A nail comprising:

a shank with a head on a first end of the shank and a tip portion on a second end of the shank, two guide flanges extending radially outward from the shank and a diameter of each of the guide flanges being larger than a diameter of the shank and less than a diameter of the head, a plurality of protrusions extending radially outward from the shank and located between the two guide flanges, a diameter of the protrusions being less than a diameter of each of the flanges, and a flexible and deformable sleeve mounted to the shank and located between the two guide flanges.

2. The nail as claimed in claim 1, wherein each of the guide flanges includes a tapered outer periphery.

3. The nail as claimed in claim 1, wherein the tip portion includes a plurality of wings extending radially outward from an outer periphery of the tip portion.

4. The nail as claimed in claim 3, wherein each of wings has a cutting edge.

* * * * *